United States Patent [19]

Solo

[11] Patent Number: 5,061,844
[45] Date of Patent: Oct. 29, 1991

[54] ACCESS CARD PROVIDED WITH CODED SECURITY MEANS

[75] Inventor: Alan J. Solo, Brooklyn, N.Y.

[73] Assignee: Valid Technologies, Ltd., New York, N.Y.

[21] Appl. No.: 469,152

[22] Filed: Jan. 25, 1990

[51] Int. Cl.⁵ .............................................. G06K 5/00
[52] U.S. Cl. .................................... 235/490; 235/380; 235/448
[58] Field of Search ................ 235/448, 490, 380, 487; 283/904, 90, 74, 75

[56] References Cited

U.S. PATENT DOCUMENTS

| | | | |
|---|---|---|---|
| 3,095,502 | 6/1963 | Sikora | 235/448 |
| 3,399,473 | 6/1966 | Jaffe | 235/487 |
| 4,562,342 | 12/1985 | Solo | 235/448 |
| 4,801,790 | 1/1989 | Solo | 235/487 |

*Primary Examiner*—David Trafton
*Assistant Examiner*—Richard M. Weinberg
*Attorney, Agent, or Firm*—Goodman & Teitelbaum

[57] ABSTRACT

An access card, such as a credit card or a key card, having a card body including a plurality of hinged tabs which can be pivoted between a first position in a first plane and a second position in a second plane so that the selected pivoted ones of the tab members in the second position provide a particular coded information for checking the authenticity of a user of the access card. The tab members are arranged in a side-by-side position preferably within a frame member having a partition member disposed between adjacent tab members. Abutment members are provided on the free ends of the tab members opposite the hinged portions, for engagement with abutment portions adjacent thereto, preferably disposed on the frame member, to maintain the selected tab members in the depressed second position even when the access card is longitudinally twisted. The frame member is preferably provided with stop members to prevent the tab members from being depressed beyond the engaged second position with the abutment portions to avoid any damage to the hinged portions of the tab members.

20 Claims, 5 Drawing Sheets

ACCESS CARD PROVIDED WITH CODED SECURITY MEANS

BACKGROUND OF THE INVENTION

This invention relates to access cards, such as credit cards and key cards, and more particularly to credit and key cards having tab members provided with abutment member disposed on free ends thereof to provide coded information, the tab members being activated by the user to avoid unauthorized use of the access card.

The use of access cards of the key card type are well known in the art, such as disclosed in U.S. Pat. No. 4,012,583 and U.S. Pat. No. 3,761,683. Furthermore, key cards are used in a security system to gain access to a particular room or security area, such as a hotel room as disclosed in U.S. Pat. No. 3,694,810, U.S. Pat. No. 3,742,453, U.S. Pat. No. 3,781,805 and U.S. Pat. No. 3,906,447.

However, the coded information on the above-mentioned key cards is set for each particular key card, so that if the key card is lost or finds its way into unauthorized hands, the unauthorized person can use any of the above mentioned key cards to gain access to the security device, room or area, where there is no way of preventing such unauthorized use one the unauthorized user has a key card or a copy thereof.

In the Applicant's U.S. Pat. No. 4,562,342, there is disclosed a credit card having a foldable tab at each corner of the credit card to provide a different code associated therewith by folding down selected ones of the corner tabs to thus provide an additional encoded information for determining the authenticity of the individual when presenting the credit card to a vendor, where the credit card itself was one of those commonly used by banks or credit companies which have become common place among purchasers. Accordingly, the use of the fold down corner tabs prevented unauthorized use of the card by unauthorized users when the credit card was lost, stolen or copied, such as when the information on the credit card was obtained from the discarded carbon paper of the sale slip.

However, due to the fact that the coded information of the Applicant's credit card was obtained from the four bent down corner tabs, the number of different coded information was limited. Furthermore, the Applicant's patented credit card did not provide any means for maintaining the corner tabs in their bent down positions, and therefore the proper coded information could accidentally be changed when one of the bent down corner tabs was inadvertently bent back up to its original position.

In view of the above, the Applicant obtained U.S. Pat. No. 4,801,790 to improve the Applicant's above-mentioned U.S. Pat. No. 4,562,342 in order to permit a greater number of different combinations, and also to provide means for maintaining the tabs in their folded or depressed position or positions. The Applicant's U.S. Pat. No. 4,801,790 discloses an access card having a card body including a plurality of hinged tab members which can be pivoted between a first position in a first plain and a second position in a second plane so that the selected pivoted ones of the tab members in the second position provide a particular coded information for checking the authenticity of a user of the access card. The tab members are arranged in a side-by-side position with a partition member disposed between adjacent tab members. Abutment members are provided on opposite sides of each tab member, and abutment portions are provided on opposite sides of each partition member for engagement with tab abutment members to maintain the selected tab members in the depressed second position. The tab members and partition members are parts of an insert member which is secured to the card body.

However, in some cases, during the handling of the access card of Applicant's U.S. Pat. No. 4,801,790, the card body might be longitudinally twisted which would cause the disengagement of the tab abutment members with the partition member abutment portions when in the depressed second position, so that the tab members would pivot back to the first position and thereby lose the particular coded information. Additionally, the Applicant's access card of U.S. Pat. No. 4,801,790 did not include any means for positively stopping the pivoting of the tab members beyond the second position, so that the tab members could be pivoted past the second position which could eventually damage the tab members at their hinged portions. Accordingly, there is a need for improving the Applicant's access card of U.S. Pat. No. 4,801,790 to insure that the tab members remain in the depressed second position even when the access card is longitudinally twisted, and also to provide stop means to prevent the tab members from being depressed beyond the second position to avoid any damage to the hinged portions of the tab members.

SUMMARY OF THE INVENTION

It is accordingly an object of the present invention to provide an access card which avoids the aforementioned problems of the prior art credit and key cards.

Another object of the present invention is to provide an access card with coded information which can be set into a card by the user of the card.

A further object of the present invention is to provide an access card which can be used to verify the authenticity of the card user.

Still another object of the present invention is to provide an access card which can be used to detect whether or not the individual presenting the card is or is not authorized for such use.

A further object of the present invention is to provide an access card which will prevent the use of counterfeit cards.

Another object of the present invention is to provide an access card having tab members thereon which can be selectively depressed to provide a particular coded information for checking the authenticity of the user of the card.

Yet another object of the present invention is to provide an access card wherein the tab members are provided with abutment members on the free ends thereof opposite the hinged portions for engagement with abutment portions adjacent thereto on the frame member to ensure that the tab members remain in their depressed position even when the access card is longitudinally twisted.

Yet, a further object of the present invention is to provide an access card wherein the frame member is provided with stop means to prevent the tab members from being depressed beyond the engagement position with the abutment portions of the frame member to avoid any damage to the hinged portions of the tab members.

Briefly, in accordance with the present invention, there is provided an access card, such as a credit card or a key card, having a card body including a plurality of hinged tabs which can be pivoted between a first position in a first plane and a second position in a second plane so that the selected pivoted ones of the tab members in the second position provide a particular coded information for checking the authenticity of a user of the access card. The tab members are arranged in a side-by-side position preferably within a frame member having a partition member disposed between adjacent tab members. Abutment members are provided on the free ends of the tab members opposite the hinged portions, for engagement with abutment portions adjacent thereto, preferably disposed on the frame member, to maintain the selected tab members in the depressed second position even when the access card is longitudinally twisted. Additionally, the frame member is preferably provided with stop means to prevent the tab members from being depressed beyond the engaged second position with the abutment portions to avoid any damage to the hinged portions of the tab members.

Furthermore, the access card can contain the usual coded information identifying the type of card, the name of the card owner, and the identification number of the card owner.

Preferably, the tab members and frame member are parts of an insert member which is secured to the card body, where the partition members of the frame member are in the same plane as the non-depressed tab members. Accordingly, the insert member can be secured to the card body by lug members, or can be sandwiched between upper and lower portions of the card body which are secured together.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of preferred embodiments in which.

In the various figures of the drawings, like reference characters designate like parts.

DESCRIPTION OF THE PREFERRED EMBODIMENTS

Figure 1:
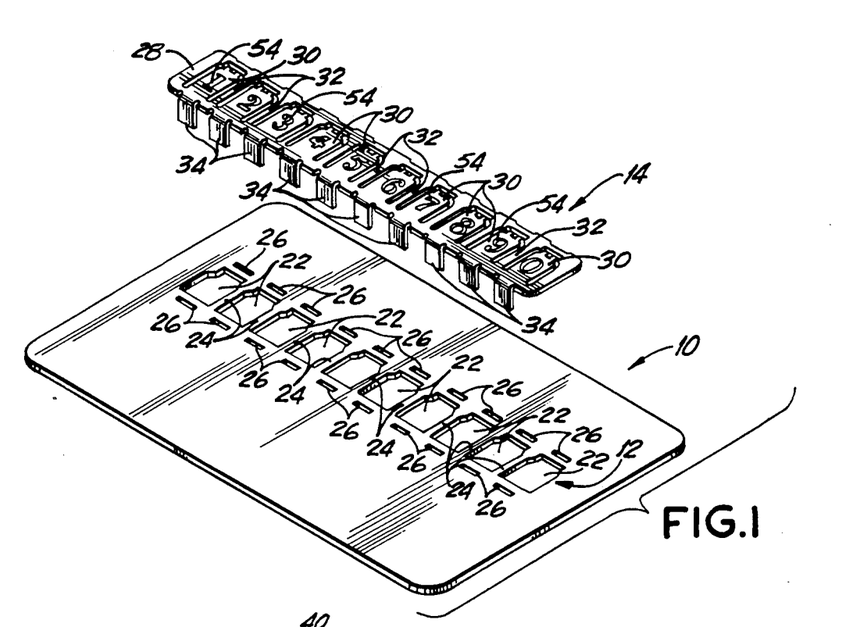
FIG. 1 is an exploded perspective view of an access card in accordance with the present invention, showing insert tab means and a card having openings therethrough for receiving the insert tab means.
Figure 2:
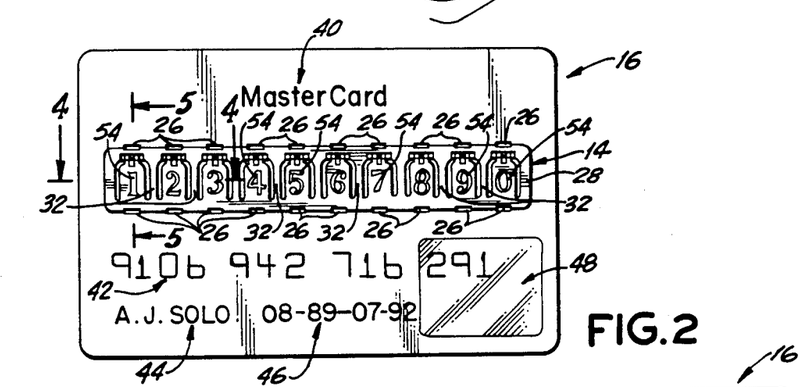
FIG. 2 is a front view of the assembled access card.
Figure 3:
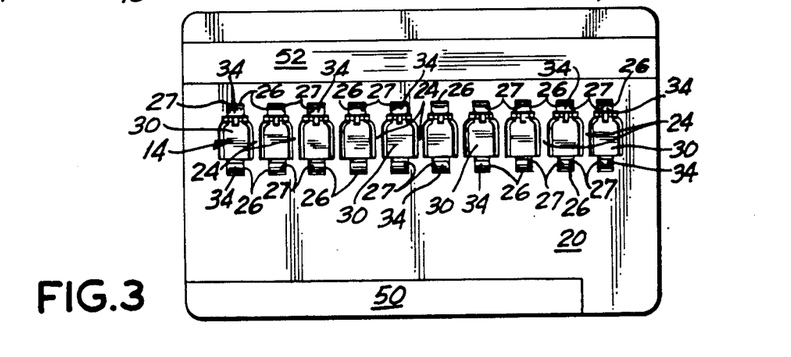
FIG. 3 is a rear view of the assembled access card.

Referring now to the drawings, FIG. 1 shows a card 10 having a designated area 12 provided with openings therethrough for receiving insert tab means 14 in order to form an access card 16, the front 18 of which is shown in FIG. 2 and the back 20 thereof being shown in FIG. 3. The card 10 has a substantial rectangular body preferably formed of plastic material, where the insert tab means 14 is preferably fabricated from a sheet metal material.

Figure 4:
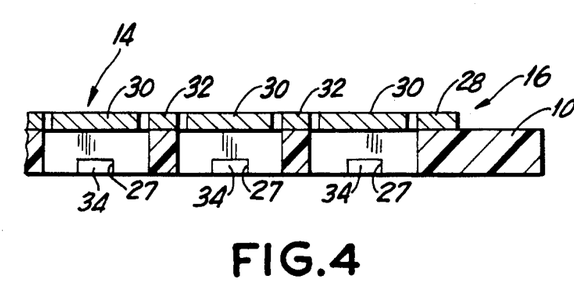
FIG. 4 is a fragmented cross sectional view taken substantially along line 4—4 of FIG. 2.
Figure 5:
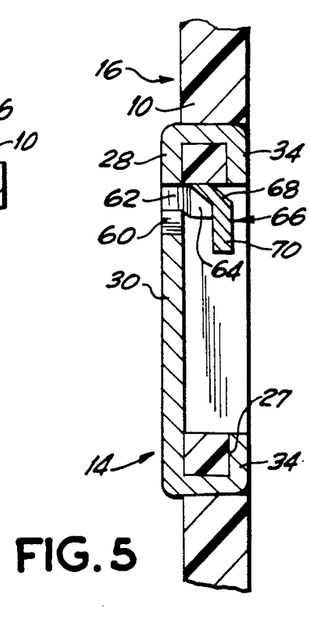
FIG. 5 is a fragmented cross sectional view taken substantially along line 5—5 of FIG. 2.

The designated area 12 includes a plurality of openings 22 extending through the card 10, preferably arranged in a side-by-side relationship with stationary partitions 24 disposed therebetween. There are preferably ten openings 22, for the reasons set forth below, though obviously this number can vary according to requirements. Additionally, a slot 26 extending through the card 10 is provided at a pre-determined spaced distance at the top and at the bottom of each of the openings 22, as best shown in FIGS. 1-3. Furthermore, as indicated in FIGS. 3-5, a plurality of recesses 27 is formed in the back 20 of the card 10, so that each recess 27 extends from its associated slot 26 to the associated opening 22, the function of which is set forth below.

The insert tab means 14 includes a substantially rectangular frame member 28 having a plurality of tab members 30 hinged thereto along one side, there preferably being ten tab members 30 to match the above-mentioned openings 22 in the card 10, where obviously this number can vary according to requirements as long as there is an opening 22 for each tab member 30. The tab members 30 are preferably arranged in a side-by-side relationship with stationary partition members 32 disposed therebetween. A plurality of lug members 34 extend perpendicularly from the periphery about the frame member 28, so that a pair of lug members 34 are disposed on opposite sides of each tab member 30, the function of which will be set forth below. Additionally, the tab members 30 and the frame member 28 are provided with abutment means for cooperation with each other, where a more detailed description thereof will be set forth below in the discussion of FIGS. 6-12.

Referring to FIG. 2, information 40 is provided on the front 18 of the access card 16, where this information 40 identifies the particular type of access card, such as a credit card, key card or the like. The access card 16 shown in FIGS. 1, 2 and 3 is of the credit card type, where the information 40 includes the name of the card company or the name of the particular bank issuing the card, where the credit card could also have particular colors and/or color scheme arrangements which would uniquely identify the card as a particular type of credit card. The information 40 is usually printed directly onto the card. It is noted, that if the access card 16 were used as a key card, the information 40 would include the particular hotel, station or device which is to be protected by the use of the key card.

Additionally, the front 18 of the access car 16 includes specific information relating to the particular card owner, such as the particular credit card identification number 42 which is preferably raised above the surface of the front 18, and also the name 44 of the owner of the card, as well as the dates 46 indicating the period of time during which the card is valid. Additionally, many credit cards now include a hologram 48 to make it difficult for a non-authorized person to copy the credit card, where preferably the identification number 42 extends into the hologram 48. It is understood, that if the access card 16 were used as a key card, the above specific information would relate to the particular device the key card is designed to protect, such as the room number, the floor number, the station number and other related information.

As shown in FIG. 3, on the back 20 of the access card 16 there is provided a blank strip 50 for the signature of the card owner in order for the person receiving the card to verify the signature of the card owner. Additionally, a magnetic strip 52 is also provided on the back 20 of the access card 16 in order to verify and transmit the credit card identification number 42 through a telephone hook-up connection. Usually, when the user of the credit card presents the card for purchases made by the user, the vendor would place the card in a verifier which transmits the specific information either obtained from the identification numb 42 on the front 18 of the card, or from the information contained in the magnetic strip 52 on the back 20 of the card to a central verifying agency, made usually by means of a telephone hook-up connection. The central agency checks the information received to verify that the number belongs to the individual whose name is imprinted on the credit card and further checks the credit availability of the owner at that time.

Accordingly, it has been found very easy for unauthorized individuals to obtain the name of the credit card owner and his corresponding assigned credit card identification number, where this information can easily be obtained from the discarded carbon paper on any sale slip or through wrongful acts of the vendor or his agents when coming in contact with the credit card. Accordingly the tab insert means 14 of the present invention provides additional security to avoid such unauthorized use of the access card 16.

In order to provide a different code for each of the access cards 16, different alpha numeric designations 54 are preferably provided on each of the ten tab members 30, preferably ranging from the numeral "1" on the left hand side to numeral "0" on the right hand side, as shown in FIG. 2. Obviously, other distinguishing identifying symbols, such as letters, can also be provided in place of the alpha numeric designations 54. The particular symbols or designations 54 can be coplanar with the front surfaces of the tab members 30, or can be embossed into or onto the tab members 30. Additionally, the symbols or designations can also be provided on the rear surface of each tab member 30, or if desired, can be eliminated from the front surface of each tab member 30, and only be provided on the rear surface of each tab member 30. The function of the tab members 30 will be described below in more detail.

In order to assemble the access card 16, the lug members 34 of the insert tab means 14 are inserted into associated openings 26 on the front 18 of the card 10, as indicated in FIG. 1, and then the insert tab means 14 is pressed downwardly so that the frame member 28 rests against the surface of the designated area 12 on the front 18, with the lug members 34 extending through the openings 26, and with the partition members 32 of the frame member 28 resting on and in alignment with the partitions 24 of the card 10, thereby providing the arrangement shown in FIG. 2. The ends of the lug members 34 are then bent inwardly into their respective recesses 27, as best shown in FIGS. 4 and 5, to securely attach the insert tab means 14 to the card 10, thereby providing the construction shown in FIG. 3, where the outer surface of the bent ends of the lug members 34 are in the same plane as the surface of the back 20, as shown in FIGS. 4 and 5. In this arrangement, each of the tab members 30 is free to pivot at its hinge from a first position in the same or parallel plane as the frame member 28 and the partition members 32, as shown in FIGS. 4 and 5, to an inclined second position relative to the plane containing the frame member 28 and the partition members 32, as will be set forth below.

Figure 6:
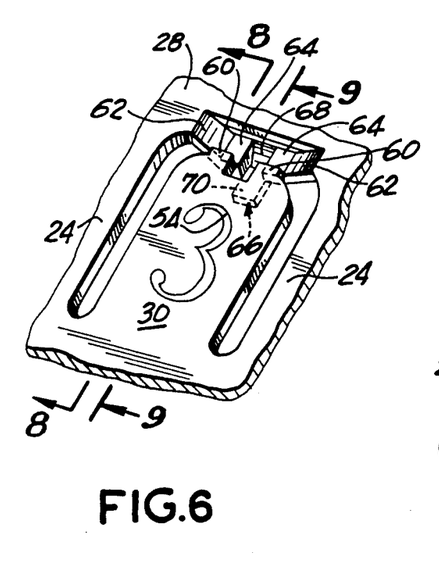
FIG. 6 is an enlarged fragmented perspective view showing the relationship between one of the tab members and the frame member of the insert tab means.
Figure 7:
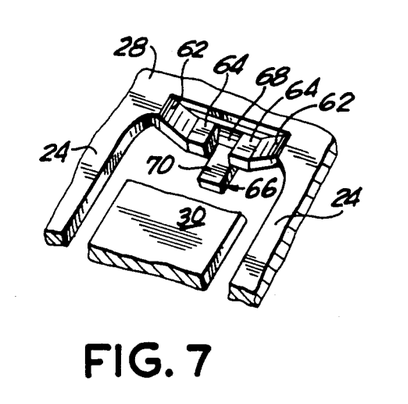
FIG. 7 is an enlarged fragmented perspective view showing portions of the members of FIG. 6 removed therefrom for a better showing of the stop means.

Referring now to FIGS. 6-11, the abutment means will now be described. As shown in FIG. 6, each of the tab members 30 has a pair of spaced apart tab abutment members 60 extending outwardly from the free end thereof opposite the hinged portion of the tab member 30. The adjacent portion of the frame member 28 is stamped or coined to provide a pair of downwardly inclined side portions 62 extending inwardly from opposite sides of the non-stamped portions of the frame member 28, and also to provide a pair of spaced apart abutment portions 64 so that one abutment portion 64 is disposed on the inward end of its associated side portion 62, as best shown in FIG. 7. Accordingly, during the stamping, the abutment portions 64 are slightly enlarged in a selected direction towards the tab member 30, the function of which will be set forth below.

Additionally, during the stamping, a stop member 66 is formed in a lower plane below and between the pair of abutment portions 64. The stop member 66 includes a downwardly inclined portion 68 which remains connected on opposite sides thereof to each of the abutment portions 64, and also includes a tongue portion 70 which is connected at one end to the inclined portion 68 and extends outwardly below the abutment portions 64 in a direction towards the hinged portion of the tab member 30, where the tongue portion 70 lies in a plane below and parallel to the non-stamped portions of the frame member 28. Here again, the tongue portion 70 is enlarged during the stamping portion, so that it extends below and past the abutment members 60, with the free end of the tongue portion 70 being positioned below a portion of the main body of the tab member 30, the function of which will be described below.

Figure 8:
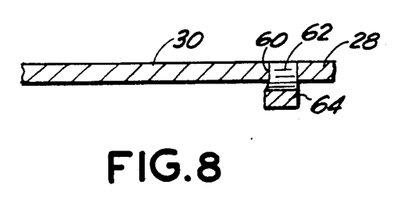
FIG. 8 is a fragmented cross sectional view taken substantially along line 8—8 of FIG. 6.
Figure 9:
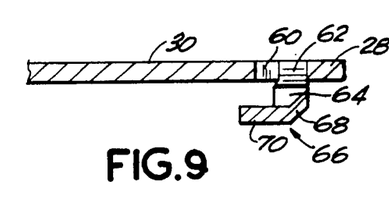
FIG. 9 is a fragmented cross sectional view taken substantially along line 9—9 of FIG. 6.

FIGS. 8 and 9 are cross sections of FIG. 6, showing the tab member 30 in the first position in the same plane as the frame member 28. As shown in FIG. 8, the abutment portion 64 of the frame member 28 is slightly enlarged so that the tab abutment member 60 overlies a portion of the abutment portion 64. As shown in FIG. 9, the tongue portion 70 is also enlarged so that the free end portion of the body of the tab member 30 overlies the tongue portion 70. Also, it is clearly shown the tongue portion 70 is positioned below the abutment portion 64.

Figure 10:
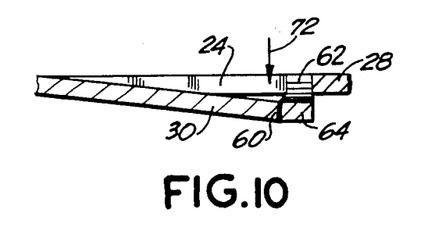
FIG. 10 is a fragmented cross sectional view similar to FIG. 8 showing the tab member in a depressed position.
Figure 11:
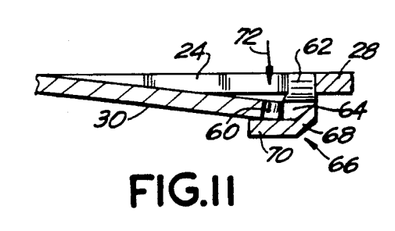
FIG. 11 is a fragmented cross sectional view similar to FIG. 9 showing the tab member in a depressed position.

Accordingly, FIGS. 10 and 11 show the tab member 30 in the inclined second position after the tab member 30 has been pressed or pushed downwardly in the direction of the arrow 72, where FIG. 10 corresponds to the showing in FIG. 8, and FIG. 11 corresponds to the showing in FIG. 9. As shown in FIG. 10, the tab abutment member 60 engages the abutment portion 64 of the frame member 28, and is held in a force-fit relationship therewith so that the tab member 30 is secured in the inclined second position once the tab member 30 is pivoted about its hinge. As shown in FIG. 11, when the tab abutment member 60 engages the abutment portion 64 of the frame member 28, the free end of the body of the tab member 30 engages against the tongue portion 70 of the stop member 66 so that the tab member 30 is prevented from being depressed any further downwardly, thus insuring the engagement between the tab abutment member 60 and the abutment portion 64, and also serving to prevent any permanent damage to the hinged portion of the tab member 30.

The above-mentioned two different positions of the tab members 30 provide a coded information for each card, depending upon which of the tab members 30 are in the inclined second position relative to the plan containing the frame member 28. Accordingly, each cardholder is given confidential information as to which of the ten tab members 30 should be depressed in order to pivot the selected tab members 30 into the inclined second position. If the access card 16 is a credit card, then when the credit card is placed in the vendor's verifier, the verifier will detect, either by mechanical or electronic means, which of the tab members 30 are in the inclined second position. The verifier will then indicate to the vendor whether or not the coded information provided by the depressed tab members 30 is proper for the particular credit card being used, where such verification can be made either by the verifier itself or through a telephone hook-up connection.

If the access card 16 is being used as a key card, then when the key card is placed in the security device, the key card having the proper tab members 30 depressed will either operate the security device, or the security device will send a signal to the hotel desk or security room to indicate whether or not the proper tab members 30 have been depressed so that a security check can be made as to whether or not an authorized person is using the key card.

Figure 12:
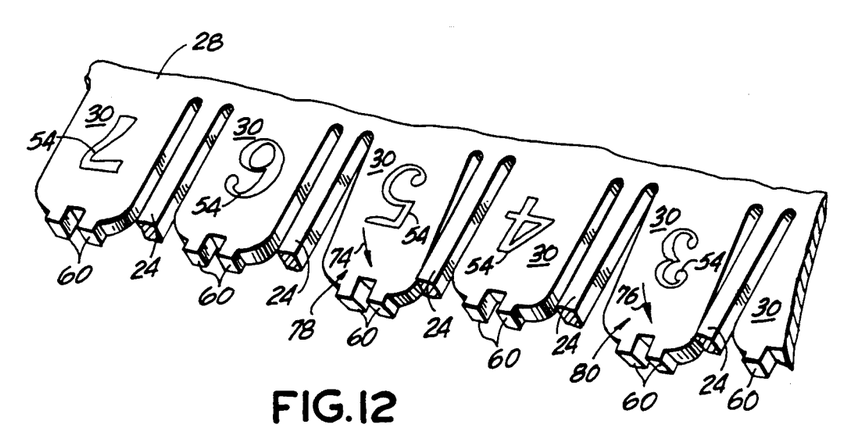
FIG. 12 is an enlarged fragmented perspective view showing some of the tab members in a depressed position.

For example, referring to FIG. 12, two of the tab members 30 are depressed in the direction of the arrows 74, 76, namely, tab member 78 having numeral "5" thereon, and tab member 80 having numeral "3" thereon. Accordingly, as shown in FIGS. 10 and 11, the abutment members 60 of the tab members 78, 80 are held in a force-fit relationship with the abutment portions 64 of the frame member 28, so that the tab members 78, 80 are secured in the inclined second position once the tab members 78, 80 are pivoted about their hinged portions. The remaining tab members 30 remain in their original first position in the same plane as the frame member 28.

Thus, the verifier or key security device will detect that tab members 78, 80 are depressed, and will send out signals indicating the inclined second position of the tab members 78, 80. After the coded information has been recorded, and the access card 16 is removed from the verifier or key security device, the tab members 78, 80 can be pushed back to their original first position in the same plane as the frame member 28. If desired, the verifier can be provided with a mechanism which will return the tab members 78, 80 to their original first position in the same plane as the frame member 28 upon the removal of the access card 16 from the verifier. Thus, with each cardholder having a different coded information according to the inclined positions of the tab members 30, many different combinations can be obtained to provide a high level of security of each access card.

Though the access card 16 has been shown to include the insert tab means 14 as a separate metal piece for securement to the preferably plastic card 10 in order to provide durability to the hinges of the tab members 30 and to the abutment members 60 thereof, and also to the abutment portions 64 of the frame member 26, where it has been found that metal members will last longer and provide more reliability than plastic members, it is understood that the access card 16 could be fabricated as a one piece integral plastic card, whereby the tab members, abutment members and abutment portions would be plastic rather than metal as indicated above.

It is further noted, that instead of the tab members 30 extending downwardly towards the bottom edge of the access card 16 as shown in FIG. 2, the insert tab means 14 could be reversed so that the tab members 30 extend upwardly towards the top edge of the access card 16. Furthermore, instead of the frame member 28 being disposed on the designated area 12 on the front 18 of the card 10, the frame member 28 could just as well be disposed on a similar designated area on the back 20 of the card 10, whereby the tab members 30 would function in the same manner as set forth above.

Figure 13:
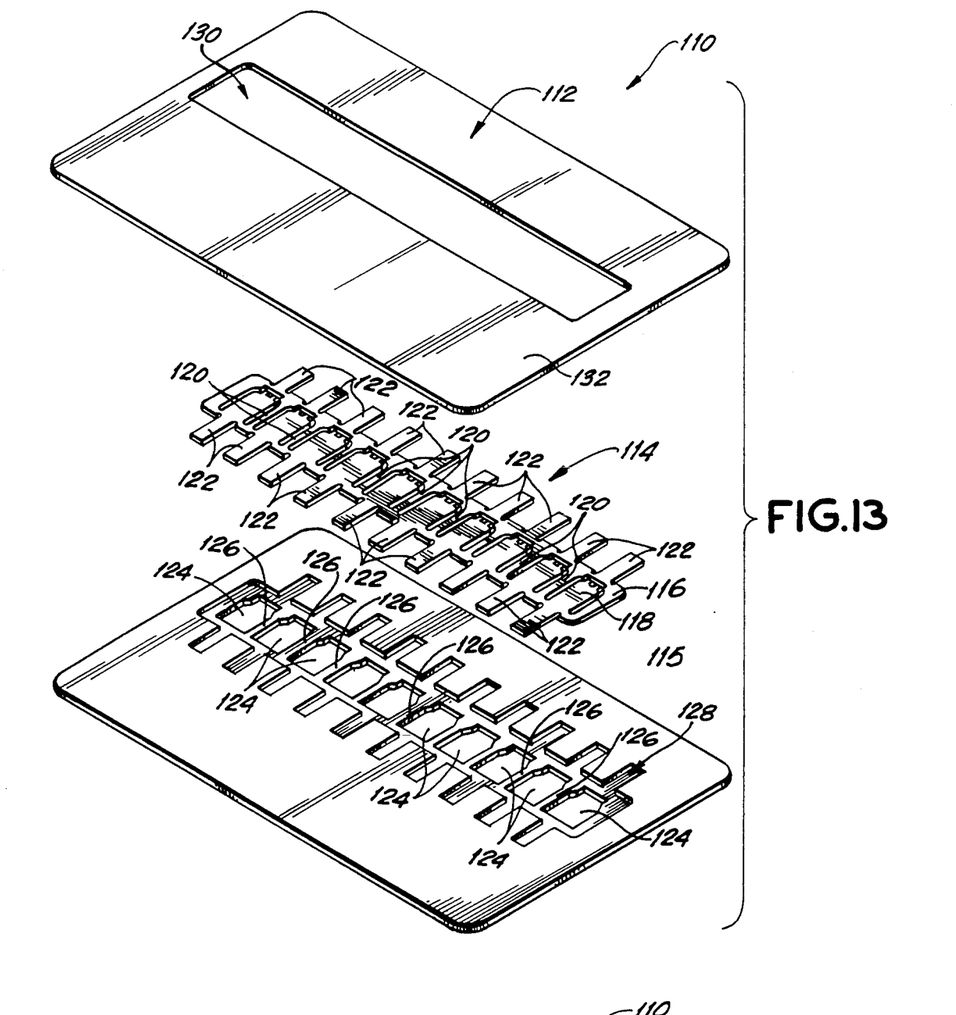
FIG. 13 is an exploded perspective view of a modified access card in accordance with the present invention.
Figure 14:
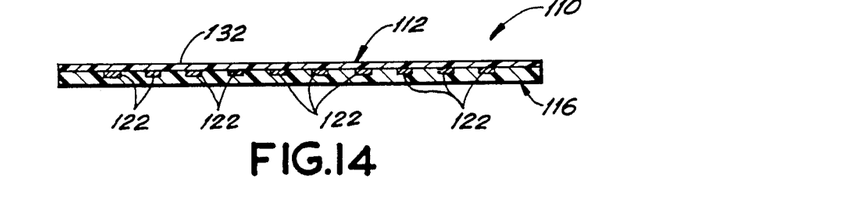
FIG. 14 is a cross sectional view of the assembled access card of FIG. 13.

FIGS. 13 and 14 show a modified access card 110 which includes three members, an upper plastic card 112, metal insert tab means 114 and a lower plastic card 115. The insert tab means 114 is similar to the above-mentioned insert tab means 14 including a substantially rectangular frame member 116 having a plurality of tab members 118 hinged thereto along one side and preferably arranged in a side-by-side relationship with stationary partition members 120 disposed therebetween, and also being provided with the same abutment means as mentioned above and shown best in FIGS. 6 and 7. However, the plurality of lug members 112 of the modified access card 110 extend outwardly in the same plane as the frame member 116, rather than extending perpendicularly downwardly from the frame member as the above-mentioned lug members 34 of the access card 16.

The lower card 115 is provided with a plurality of openings 124 extending therethrough and arranged in a side-by-side relationship with stationary partitions 126 disposed therebetween. The openings 124 are similar to the above-mentioned openings 22, and the partitions 126 are similar to the above-mentioned partitions 24, and function in the same manner as mentioned above to match the tab members 118 and partition members 120 of the frame member 116 so that the tab members 118 can be depressed in the same manner as the above-mentioned tab members 30. Additionally, a recess 128 is formed in the lower card 115 around the openings 124 and the partitions 126, where the recess 128 has the same shape as the frame member 116 with the lug members 122 thereon. The back of the lower card 115, not shown, would be provided with a blank signature strip and a verifier magnetic strip the same as the above-mentioned back 20 of the access card 16 shown in FIG. 3.

The upper card 112 has an opening 130 therethrough, the opening 130 having the same matching shape as the frame member 116 if the lug members 122 were removed therefrom. Furthermore, though not shown, the front 132 of the upper card 112 would be provided with the information identifying the particular type of access card, the particular credit card identification number, the name of the owner of the card, the dates indicating the period of time during which the card is valid, and preferably a hologram, the same as the above-mentioned front 18 of the access card 16 shown in FIG. 2.

In assembling the access card 110, the frame member 116 and lug members 122 are inserted into the recess 128 of the lower card 115, where the depth of the recess 128 is the same as the thickness of the frame member 116 and lug members 122. Thereafter, the upper card 112 is placed on top of the lower card 115 so that the portions of the upper card 112 around the opening 130 overlie the lug members 112, as best shown in the cross section view of FIG. 14, and so that the tab members 118 are visible through the opening 130. The upper and lower cards 112, 115 are secured together by conventional means, such as cement, adhesive, heating, fusing and the like to sandwich the lug members 122 therebetween, and thereby secure the insert tab means 114 in a fixed position in the access card 110.

Figures 15, 16, 17:
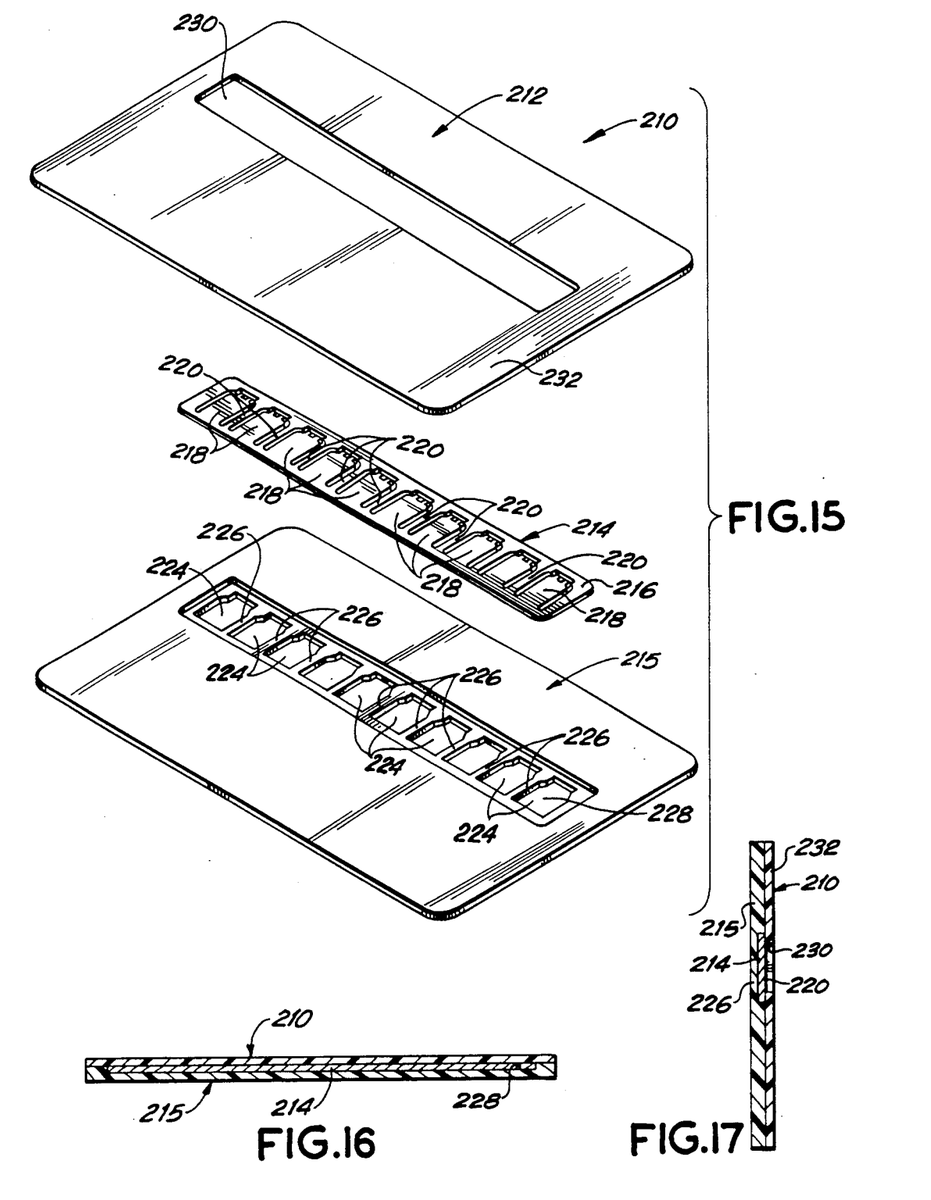
FIG. 15 is an exploded perspective view of a further modified access card in accordance with the present invention.
FIG. 16 is a longitudinal cross sectional view of the assembled access card of FIG. 15.
FIG. 17 is a transverse cross sectional view of the assembled access card of FIG. 15.

FIGS. 15, 16 and 17 show a further modified access card 210 which includes three members, an upper plastic card 212, metal insert tab means 214 and a lower plastic card 215. The insert tab means 214 is similar to the above-mentioned tab means 14, 114 including a substantially rectangular frame member 216 having a plurality of tab members 218 hinged thereto along one side and preferably arranged in a side-by-side relationship with stationary partition members 220 disposed therebetween, and also being provided with the same abutment means as mentioned above and shown best in FIGS. 6 and 7. However, the insert tab means 214 has no lug members as provided in the above two mentioned insert tab means 14, 114.

The lower card 115 is provide with a plurality of openings 224 extending therethrough and arranged in a side-by-side relationship with stationary partitions 226 disposed therebetween. The openings 224 are similar to the above-mentioned openings 22 and 124, and the partitions 226 are similar to the above-mentioned partitions 24 and 126, and function in the same manner as mentioned above to match the tab members 218 and partition members 220 of the frame member 216 so that the tab members 218 can be depressed in the same manner as the above-mentioned tab members 30. Additionally, a recess 228 is formed in the lower card 215 around the openings 224 and the partitions 226, where the recess 228 has the same shape as the frame member 216. Here again, the back of the lower card 215, not shown, would be provided with a blank signature strip and a verified magnetic strip the same as the above-mentioned back 20 of the access card 16 shown in FIG. 3.

The upper card 212 has an opening 230 therethrough, the opening 230 being slightly smaller than the frame member 216 so that the walls of the opening 230 can engage the perimeter of the frame member 216 as best shown in FIG. 17. Furthermore, here again, though not shown, the front 232 of the upper card 212 would be provided with the information identifying the particular type of access card, the particular credit card identification number, the name of the owner of the card, the dates indicating the period of time during which the card is valid, and preferably a hologram, the same as the above-mentioned front 18 of the access card 16 shown in FIG. 2.

In assemblying the access card 210, the frame member 216 is inserted into the recess 228 of the lower card 215, where the depth of the recess 228 is the same as the thickness of the frame member 216, as shown in FIG. 16 taken through a longitudinal side portion of the perimeter of the frame member 216. Thereafter, the upper card 212 is placed on top of the lower card 215 so that the walls around the opening 230 overlie the perimeter of the frame member 216, as best shown in the cross sectional view of FIG. 17 taken through one of the partition members 220, with the tab members 218 being visible through the opening 230. The upper and lower cards 212, 215 are then secured together by conventional means, such as cement, adhesive, heating, fusing and the like to sandwich the frame member 216 therebetween, as shown in FIG. 16, and thereby secure the insert tab means 214 in a fixed position in the access card 210.

Numerous alterations of the structure herein disclosed will suggest themselves to those skilled in the art. However, it is to be understood that the present disclosure relates to preferred embodiments of the invention which are for purposes of illustration only, and are not to be construed as a limitation of the invention.

What is claimed is:

1. An access card comprising:
   a card body;
   tab means on said card body to provide coded information to avoid unauthorized use of said access card;
   said tab means including a plurality of tab members, each tab member being hinged at one end to permit each tab member to be individually pivoted between a first position in a first plane and a second position in a second plane;
   engagement means on said card body to maintain selected pivoted ones of said tab members in said second position to provide a particular coded information for checking authenticity of a user of said access card;
   said engagement means including abutment portions for engaging said selected pivoted ones of said tab members in said second position;
   said tab members being disposed in a parallel side-by-side arrangement in said first position with opposing free ends of said tab members extending in same direction;
   said engagement means including abutment members disposed on said free ends of each of said tab members for coaction with said abutment portions disposed adjacent thereto in said second position of said tab members so that said selected pivoted ones of said tab members are maintained in said second position when said card body is longitudinally twisted; and
   said abutment portions being disposed in a third plane parallel to said first plane, and said tab abutment members being in said first plane when said tab members are in said first position.

2. An access card as in claim 1, wherein said second plane is inclined relative to said first plane.

3. An access card as in claim 1, wherein said tab abutment members when in said first plane are spaced from said abutment portions in said third plane.

4. An access card as in claim 1, wherein stop means are disposed in a fourth plane to prevent said tab members from being depressed beyond said second position past said abutment portions.

5. An access card comprising:
a card body;
tab means on said card body to provide coded information to avoid unauthorized use of said access card;
said tab means including a plurality of tab members, each tab member being hinged at one end to permit each tab member to be individually pivoted between a first position in a first plane and a second position in a second plane;
engagement means on said card body to maintain selected pivoted ones of said tab members in said second position to provide a particular coded information for checking authenticity of a user of said access card;
said engagement means including abutment portions for engaging said selected pivoted ones of said tab members in said second position;
said tab members being disposed in a parallel side-by-side arrangement in said first position with opposing free ends of said tab members extending in same direction;
said engagement means including abutment members disposed on said free ends of each of said tab members for coaction with said abutment portions disposed adjacent thereto into said second position of said tab members so that said selected pivoted ones of said tab members are maintained in said second position when said card body is longitudinally twisted; and
one of a plurality of partition members being disposed between each pair of adjacent ones of said tab members.

6. An access card as in claim 5, including stop means to prevent said tab members from being depressed beyond said second position.

7. An access card as in claim 5, wherein said card body includes information representing a type of credit card, and raised encoded symbols for identifying said credit card's owner.

8. An insert member as in claim 5, wherein said second plane is inclined relative to said first plane.

9. An access card comprising:
a card body;
tab means on said card body to provide coded information to avoid unauthorized use of said access card;
said tab means including a plurality of tab members, each tab member being hinged at one end to permit each tab member to be individually pivoted between a first position in a first plane and a second position in a second plane;
engagement means on said card body to maintain selected pivoted ones of said tab members in said second position to provide a particular coded information for checking authenticity of a user of said access card;
said engagement means including abutment portions for engaging said selected pivoted ones of said tab members in said second position;
said tab members being disposed in a parallel side-by-side arrangement in said first position with opposing free ends of said tab members extending in same direction;
said engagement means including abutment members disposed on said free ends of each of said tab members for coaction with said abutment portions disposed adjacent thereto in said second position of said tab members so that said selected pivoted ones of said tab members are maintained in said second position when said card body is longitudinally twisted; and
said tab members and said engagement means being parts of an insert member, and securement means for securing said insert member to said card body.

10. An access card as in claim 9, wherein said card body includes openings therethrough, and said securement means includes lug members extending from said insert member for securing said insert member in said openings.

11. An access card as in claim 9, wherein said card body includes an upper card portion and a lower card portion, said securement means includes sandwiching said insert member between said upper and lower card portions.

12. An access card as in claim 9, wherein a recess is provided in one of said upper and lower card portions for seating said insert member.

13. An access card as in claim 9, wherein one of a plurality of partition members is disposed between each pair of adjacent ones of said tab members on said insert member, and said card body includes a plurality of associated partitions for supporting said partition members of said insert member.

14. An insert member for an access card comprising:
a frame member;
tab means on said frame member to provide coded information to avoid unauthorized use of an access card;
said tab means including a plurality of tab members, each tab member being hinged at one end to said frame member to permit each tab member to be individually pivoted between a first position in a first plane and a second position in a second plane;
engagement means on said frame member to maintain selected pivoted ones of said tab members in said second position to provide a particular coded information for checking authenticity of a user of an access card;
said engagement means including abutment portions for engaging said selected pivoted ones of said tab members in said second position;
said tab members being disposed in a parallel side-by-side arrangement in said first position with opposing free ends of said tab members extending in same direction;
said engagement means including abutment members disposed on said free ends of each of said tab members for coaction with said abutment portions disposed adjacent thereto in said second position of said tab members so that said selected ones of said tab members are maintained in said second position when said frame member is longitudinally twisted; and
said abutment portions being disposed in a third plane parallel to said first plane, and said tab abutment members being in said first plane when said tab members are in said first position.

15. An insert member as in claim 14, wherein said tab abutment members when in said first plane are spaced from said abutment portions in said third plane.

16. An insert member as in claim 14, wherein stop means are disposed in a fourth plane to prevent said tab members from being depressed beyond said second position past said abutment portions.

17. An insert member as in claim 14, wherein said frame member includes securement means for securing said insert member to the access card.

18. An insert member for an access card comprising:

a frame member;

tab means on said frame member to provide coded information to avoid unauthorized use of an access card;

said tab means including a plurality of tab members, each tab member being hinged at one end to said frame member to permit each tab member to be individually pivoted between a first position in a first plane and a second position in a second plane;

engagement means on said frame member to maintain selected pivoted ones of said tab members in said second position to provide a particular coded information for checking authenticity of a user of an access card;

said engagement means including abutment portions for engaging said selected pivoted ones of said tab members in said second position;

said tab members being disposed in a parallel side-by-side arrangement in said first position with opposing free ends of said tab members extending in same direction;

said engagement means including abutment members disposed on said free ends of each of said tab members for coaction with said abutment portions disposed adjacent thereto in said second position of said tab members so that said selected ones of said tab members are maintained in said second position when said frame member is longitudinally twisted;

said frame member including securement means for securing said insert member to the access card; and said securement means including lug members extending from said frame member.

19. An insert member as in claim 18, including stop means to prevent said tab members from being depressed beyond said second position.

20. An insert member as in claim 18, wherein one of a plurality of partition members is disposed between each pair of adjacent ones of said tab members.

* * * * *